(12) United States Patent
Kolde et al.

(10) Patent No.: US 8,151,293 B1
(45) Date of Patent: Apr. 3, 2012

(54) SYSTEM AND METHOD FOR EVENT-BASED AUTOMATIC TUNING

(75) Inventors: Hubert E. Kolde, Mercer Island, WA (US); Michael J. Markman, Kirkland, WA (US)

(73) Assignee: ARRIS Group, Inc., Suwanee, GA (US)

( * ) Notice: Subject to any disclaimer, the term of this patent is extended or adjusted under 35 U.S.C. 154(b) by 1398 days.

(21) Appl. No.: 10/259,273

(22) Filed: Sep. 27, 2002

(51) Int. Cl.
  *H04N 7/10* (2006.01)
  *H04N 5/445* (2011.01)

(52) U.S. Cl. ............... 725/32; 725/34; 725/36; 725/38; 725/42; 725/46

(58) Field of Classification Search ............ 725/32, 725/34, 36, 42, 46, 47, 38
See application file for complete search history.

(56) References Cited

U.S. PATENT DOCUMENTS

| | | | |
|---|---|---|---|
| 6,035,304 A * | 3/2000 | Machida et al. | 707/104.1 |
| 6,144,401 A * | 11/2000 | Casement et al. | 725/30 |
| 6,408,437 B1 * | 6/2002 | Hendricks et al. | 725/132 |
| 6,519,770 B2 * | 2/2003 | Ford | 725/28 |
| 6,751,401 B1 * | 6/2004 | Arai et al. | 386/83 |
| 6,772,433 B1 * | 8/2004 | LaJoie et al. | 725/52 |
| 7,317,704 B2 * | 1/2008 | Carpelan | 370/329 |
| 2002/0026642 A1 * | 2/2002 | Augenbraun et al. | 725/109 |
| 2002/0063621 A1 * | 5/2002 | Tseng et al. | 340/2.7 |
| 2002/0116712 A1 * | 8/2002 | Schein et al. | 725/58 |
| 2002/0138497 A1 * | 9/2002 | Chen et al. | 707/104.1 |
| 2002/0194593 A1 * | 12/2002 | Tsuchida et al. | 725/32 |
| 2003/0115595 A1 * | 6/2003 | Stevens et al. | 725/32 |
| 2003/0153264 A1 * | 8/2003 | Osato et al. | 455/3.06 |
| 2005/0149981 A1 * | 7/2005 | Augenbraun et al. | 725/112 |
| 2008/0168138 A1 * | 7/2008 | Simpson | 709/204 |
| 2008/0172690 A1 * | 7/2008 | Kanojia et al. | 725/36 |
| 2009/0070291 A1 * | 3/2009 | Tadayon et al. | 707/2 |

* cited by examiner

*Primary Examiner* — Pankaj Kumar
*Assistant Examiner* — Franklin Andramuno
(74) *Attorney, Agent, or Firm* — Troy A. Van Aacken; Robert J. Starr

(57) ABSTRACT

A system for automatically tuning to a channel based on an event includes a tuner to tune to a first channel, an event table to associate an event with a second channel, and event detector to detect the event and to instruct the tuner to tune to the second channel in response to the event.

31 Claims, 8 Drawing Sheets

304

| Event | Channel |
|---|---|
| Commercial Interruption | CNBC, ESPN, KQUED |
| Emergency Broadcast | KMSK |
| Objectionable Language | DISN |
| *Frasier*, 7:00PM | NBC |

304

| Event | Channel |
|---|---|
| Commercial Interruption | CNBC, ESPN, KQUED |
| Emergency Broadcast | KMSK |
| Objectionable Language | DISN |
| *Frasier*, 7:00PM | NBC |

FIG. 4

SYSTEM AND METHOD FOR EVENT-BASED AUTOMATIC TUNING

BACKGROUND

1. Field of the Invention

The present invention relates generally to entertainment systems. More specifically, the present invention relates to automatic tuning within an entertainment system.

2. Description of Related Background Art

Television viewers accept commercial advertisements or "commercials" as a fact of life. Nevertheless, a dislike for commercials motivates many viewers to "channel surf" whenever a commercial break ensues.

Unfortunately, random channel surfing is not very satisfying to viewers for a number of reasons. For instance, viewers sometimes spend the entire period of a commercial break trying to find a worthwhile alternative. Furthermore, if a viewer finds another television program to watch during a commercial break, the viewer may become so absorbed in the new program that he or she does not return to the original broadcast until well after the commercial break has concluded. Accordingly, the viewer may miss significant portions of the original broadcast.

BRIEF DESCRIPTION OF THE DRAWINGS

Non-exhaustive embodiments of the invention are described with reference to the figures, in which:

FIG. 4 is an event table;

DETAILED DESCRIPTION

Figure 1:
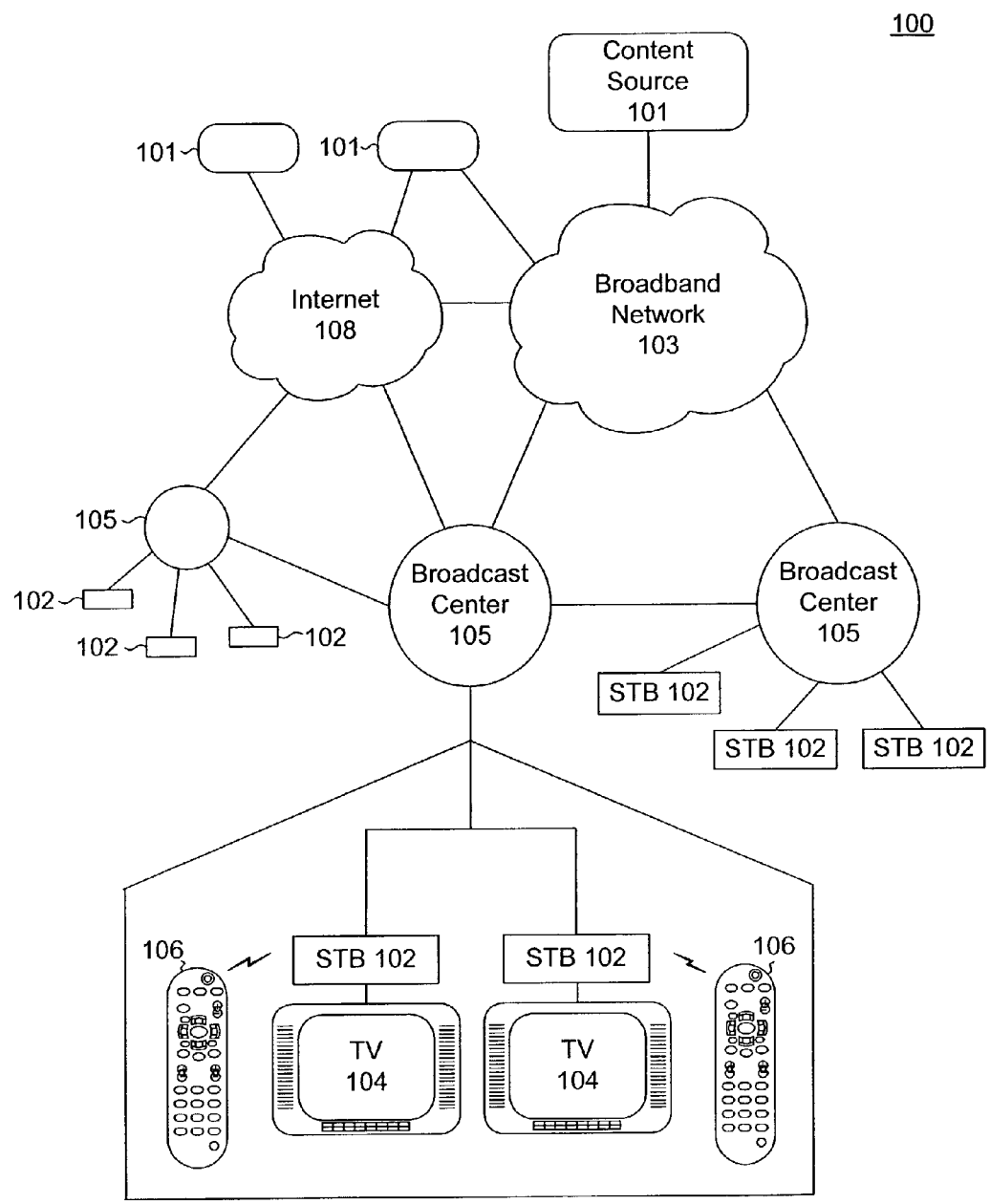
FIG. 1 is a block diagram of a system for distributing media signals to subscribers.

Reference is now made to the figures in which like reference numerals refer to like or similar elements. For clarity, the first digit or digits of a reference numeral indicates the figure number in which the corresponding element is first used.

Throughout the specification, reference to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

As used herein, the term "coupled" refers not only to components that are directly connected, but also to components that are connected via one or more other components. Hence, the term "coupled" may also refer to components that are in communication with one another, although no physical connection may exist.

In the following description, numerous specific details, such as examples of programming, software modules, user selections, network transactions, database queries, database structures, etc., are provided for a thorough understanding of the embodiments of the invention. Those skilled in the art will recognize, however, that the invention can be practiced without one or more of the specific details, or with other methods, components, materials, etc. In other instances, well-known structures, materials, or operations are not shown or not described in detail to avoid obscuring aspects of the invention. Furthermore, the described features, structures, or characteristics may be combined in any suitable manner in one or more embodiments.

As illustrated in FIG. 1, a typical system 100 for distributing media signals to subscribers includes one or more content sources 101 linked to plurality of set top boxes (STBs) 102 by a broadband network 103. As used herein, the term "media signals" should be broadly construed to include video and/or audio content, pictures, animations, text, software programs, etc. As such, content sources 101 may include television networks, websites, video servers, music servers, software archives, databases, and the like.

An STB 102 receives media signals from the content source(s) 101 via the network 103 and displays the same on a television (TV) 104 or similar display device. As its name implies, an STB 102 is typically located on or in close proximity to the TV 104. Conventionally, each TV 104 must have its own STB 102 in order to receive and display media signals.

The broadband network 103 is typically a cable TV network or a direct broadcast satellite (DBS) network, although other networks are possible. The STBs 102 are coupled to the network 103 directly or through one or more broadcast centers 105.

In the context of a cable TV network, a broadcast center 105 is referred to as a "head-end", i.e., a centrally-located facility within a community in which TV programming is received from a local cable TV satellite downlink or other source and packaged for transmission to subscriber homes. A broadcast center 105 may also be embodied as a satellite broadcast center within a DBS network.

Broadcast centers 105 may be coupled directly to one another or through the broadband network 103. In some cases, broadcast centers 105 may be connected via other networks, one particular example of which is the Internet 108. Communication over the Internet 108 is accomplished using TCP/IP and other standard protocols.

For each STB 102, a remote control 106 is generally provided for convenient remote operation of the STB 102 and the TV 104. The remote control 106 may use infrared (IR), radio frequency (RF), or other wireless technologies to transmit control signals to the STB 102 and the TV 104.

Figure 2:
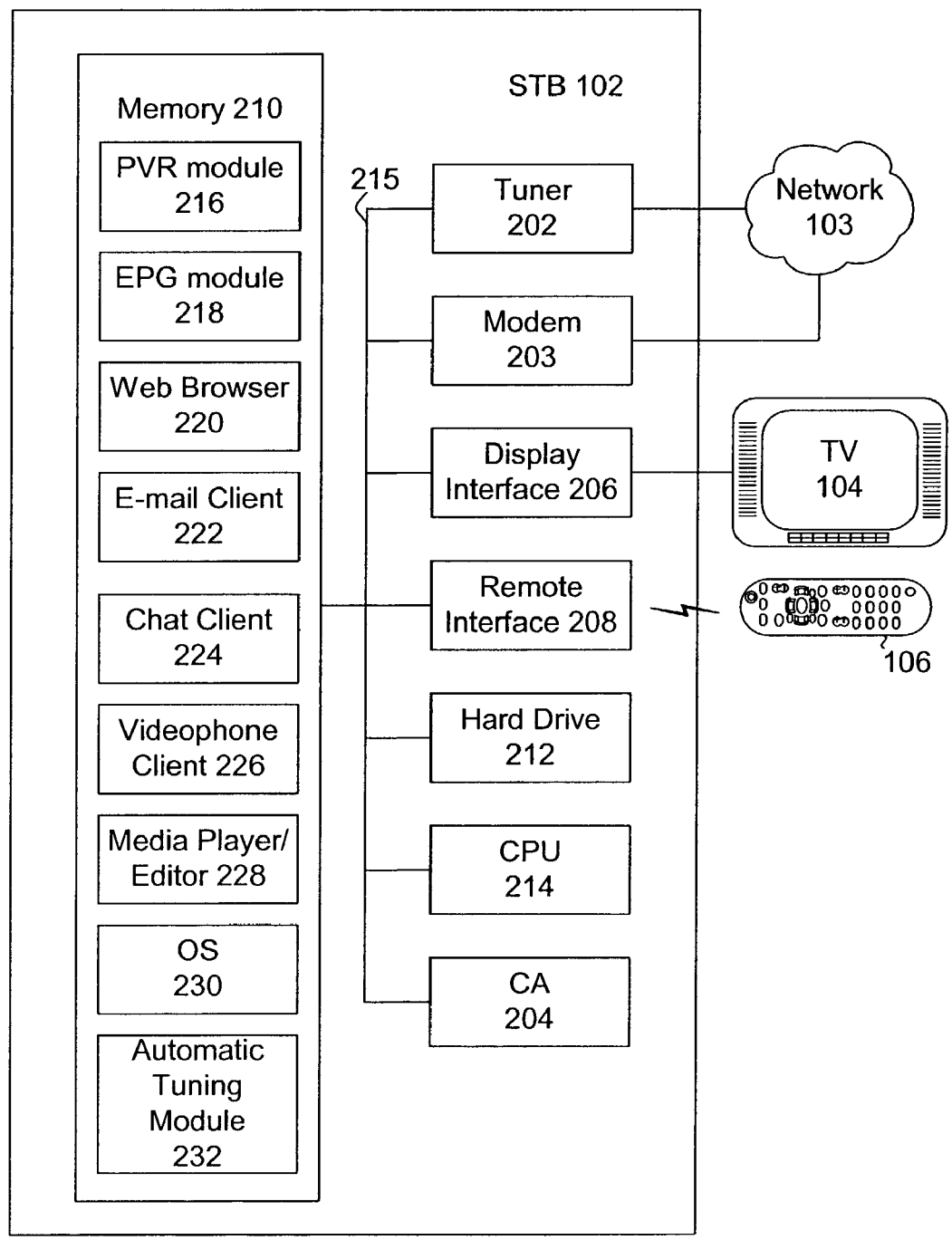
FIG. 2 is a block diagram of a set top box (STB)

FIG. 2 is a detailed block diagram of a standard STB 102, such as a Motorola™ DCT5200™. As depicted, the STB 102 includes a tuner 202 for selectively receiving media signals from the broadband network 103 on different channels or frequencies. Various analog tuners 202 are available, such as the Broadcom™ BCM 3415™.

Increasingly, TV broadcasts are being digitally encoded and multiplexed to maximize bandwidth usage. For instance, "digital" cable systems utilize MPEG (Moving Pictures Experts Group) compression to provide subscribers with many more channels than would be possible using analog techniques. Accordingly, a "digital" tuner 202 may include circuitry for selectively demodulating, demultiplexing, and decoding such content.

The STB 102 may also include a modem 203 for communication with the Internet 108 and/or the broadband network 103. The modem 203 may be embodied as a Motorola™ cable modem, which conforms, for instance, to the Data Over Cable Service Interface Specification (DOCSIS). Alternatively, the modem 203 may be adapted to communicate with a Public Switched Telephone Network (PSTN).

The STB 102 may also include a conditional access (CA) device 204 for decrypting media signals for premium and pay-per-view (PPV) channels or services (e.g., HBO™, Showtime™, OnDemand™). A CA device 204 makes use of both scrambling and encryption technologies to prevent reception of a signal by unauthorized STBs 102. In one technique, encrypted messages, known as Entitlement Control Message (ECM) and Entitlement Management Message (EMM), are used. CA devices 204 and techniques are known in the art and will not be discussed in greater detail.

The STB 102 further includes a display interface 206 for rendering media signals on an attached display device, such as a TV 104. A display interface 206 typically includes a graphical processor, a memory (frame buffer), a digital-to-analog converter (DAC), and various other supporting hardware for outputting media signals capable of being displayed by an analog or digital TV 104. A variety of display interfaces 206 are known, such as the ATI™ Xilleon™ 215s.

The STB 102 also includes a remote interface 208 for receiving and decoding control signals sent by a remote control 106. As noted, various wireless techniques may be used, such as infrared (IR), radio frequency (RF), or the like. In one configuration, the remote interface 208 is embodied as an ATMEL™ Mega161™ IR microcontroller.

Typically, the STB 102 includes a memory 210 comprising a combination of one or more standard RAM, ROM, or EEPROM devices. The memory 210 is used for storing program code, user settings, and other data. Similarly, the STB 102 includes a hard drive 212 or other mass storage unit for storing media streams, applications, databases, etc.

The STB 102 also typically includes a CPU 214 for controlling the operation of the STB 102, including the other components thereof, which are coupled to the CPU 214 via a bus 215. The CPU 214 may be embodied as a microprocessor, microcontroller, digital signal processor (DSP), or other device known in the art. The CPU 214 performs logical and arithmetic operations based on program code stored within the memory 210.

The memory 210 of the STB 102 generally includes a number of software modules, objects, or applications. Of course, any of the described modules may be implemented using various combinations of software, hardware, and/or firmware.

For instance, the memory 210 may include a personal video recording (PVR) module 216 to facilitate digital recording of media signals. The popularity of PVR systems, such as TiVo™ and ReplayTV™, has tremendously increased in recent years. PVR systems provide a wide variety of desirable functions, such as scheduled recording of TV broadcasts for time-shifting purposes, pausing (buffering) of live TV, instant replays, and the like.

The memory 210 may also include an EPG (electronic programming guide) module 218 that provides a subscriber with a view of upcoming television programming. The EPG module 218 may display programming information in various formats, such as a timeline, grid, or the like, allowing a subscriber to easily view upcoming or current programming. In addition, the EPG module 218 may interact with the PVR module 216 to allow a subscriber to select programs for recording directly from an EPG listing. The EPG module 218 typically obtains programming information from the network 103 using the modem 203.

The memory 210 may further include a web browser 220, such as a version of Microsoft Internet Explorer™, to facilitate access to web content within the Internet 108. Similarly, the memory 210 may include an e-mail client 222, such as Microsoft Outlook™, a chat (instant messaging) client 224, such as MSN Messenger™, a videophone client 226, such as Microsoft Netmeeting™, and a media player/editor 228, such as Windows Media Player™ and/or Windows Movie Maker™.

Furthermore, the memory 210 may include an operating system (OS) 230, such as Windows XP™, Windows CE™, or Linux™ for managing the other modules described above. Middleware, such as Liberate™, may also be provided to facilitate interaction between the OS 230 and the described modules.

As described in greater detail below, the STB 102 may further include an automatic tuning module 232 for automatically tuning to a new channel in response to an event, such as a commercial break. The new channel may be predetermined (e.g., specified by a user in advance) or may be selected randomly as explained below. While illustrated as a software module, the automatic tuning module 232 may be implemented in other embodiments using any suitable combination of software, hardware, and/or firmware.

Figure 3:
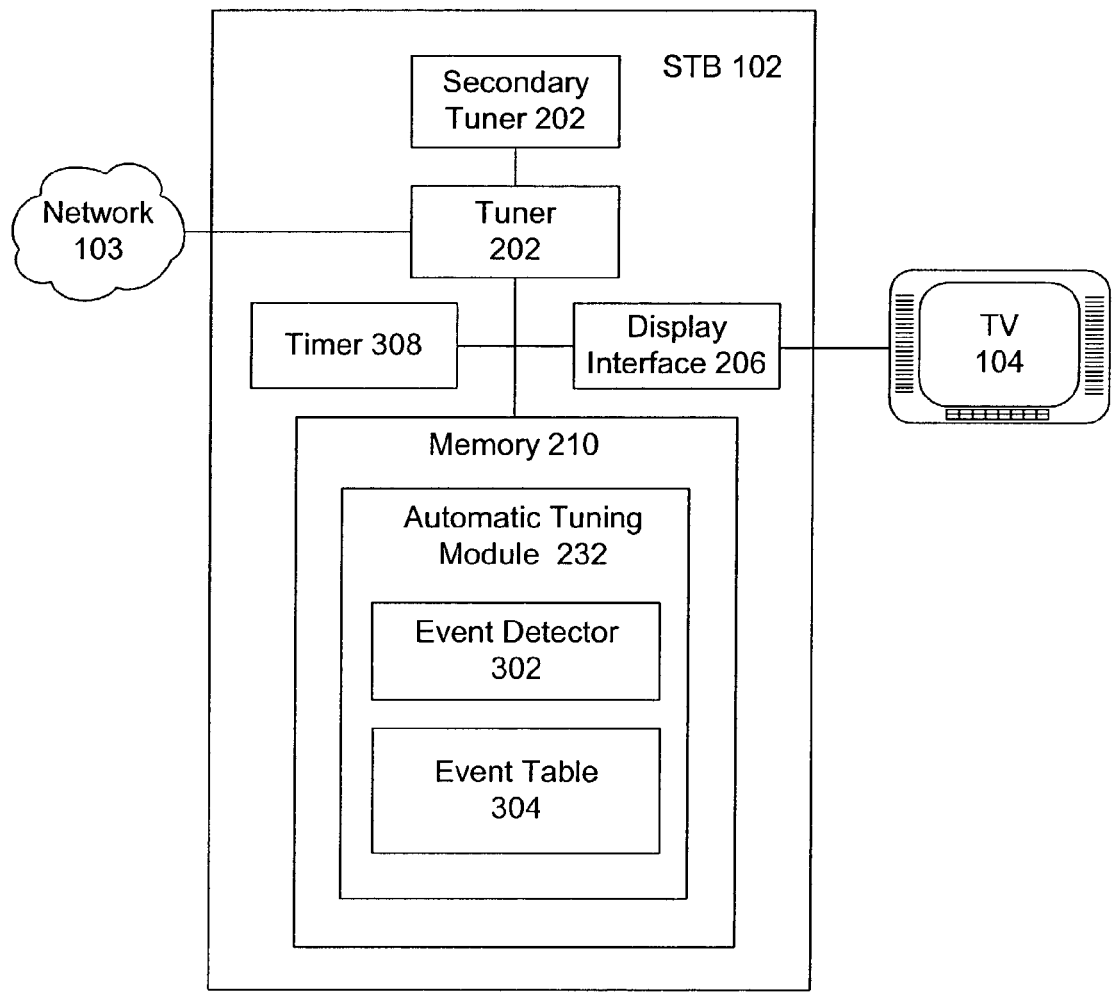
FIG. 3 is a block diagram of an STB showing details of an automatic tuning module.

FIG. 3 is a block diagram of the STB 102 showing further details of the automatic tuning module 232. In one embodiment, the automatic tuning module 232 includes an event detector 302 to monitor for and detect certain user-specified events. The automatic tuning module 232 further includes an event table 304 that associates each user-specified event with a channel (or set of channels) to change to in response to the event being detected. In an alternative embodiment, a user may specify that the STB 102 should tune to a random channel in response to an event.

When an event specified in the event table 304 is detected, the event detector 302 instructs the tuner 202 to tune to and display the specified channel in the event table 304 (or a random channel, if specified).

As noted, one type of event may be commercial. The event detector 302 detects commercials using various known techniques, e.g., lapses in closed captioning greater than a particular threshold, occurrences of black frames, high rates of scene changes and motion, volume exceeding a particular threshold, discrete messages or triggers in the broadcast indicating a commercial, etc.

Another event may be an emergency broadcast from the Emergency Alert System (EAS). For instance, where an emergency broadcast indicates a severe weather condition, a user may desire the STB 102 to automatically tune from a national broadcast to a local broadcast for detailed coverage of the emergency by a local news agency. As with commercial interruptions, EAS alerts may be readily detected using known indicators, e.g., EAS header codes, the attention signal, etc.

In one embodiment, the event detector 302 may also operate as a parental filter. For instance, the event detector 302 may determine the age-based rating of a television broadcast, e.g., TV-Y, TV-Y-7, TV-G, TV-14, and TV-M, using conventional techniques. If the age-based rating for the displayed channel exceeds a specified threshold, the event detector 302 instructs the tuner 202 to switch to a different channel specified in the event table 304, e.g., the Disney Channel™

In other embodiments, the event detector 302 may monitor closed captioning (CC) data associated with a broadcast for objectionable language, e.g, profanity, obscenity, scatological language, etc. If objectionable language is detected, the event detector 302 may instruct the tuner 202 to change the channel.

When objectionable programming is detected resulting in a channel change, the event detector 302 may block access to the previously-viewed channel. The blocking could be temporary, e.g., a few hours, or permanent, e.g., until a parent or other authorized person enters a password. Methods for blocking access to a channel are known in the art. The blocking may not necessarily be performed by the event detector 302, but may be performed, for example, by the tuner 202.

In yet another embodiment, a user may desire the STB 102 to automatically tune to a different channel when a specified program is to begin. Accordingly, the starting of the specified program may also be an event within the event table 304 that causes the tuner 202 to change to a different channel (e.g., the channel of the specified program). The starting time of the program may be obtained, for example, from EPG data available to the EPG module 218. The event detector 302 may rely on a timer 308 within the STB 102 to determine that the broadcast time for the specified program has arrived.

In one embodiment, the event detector 302 may cause the tuner 202 to tune to a new channel without seeking user approval. However, in an alternative embodiment, a user is prompted for approval before tuning to the new channel. In still another embodiment, a user is notified of the event after the tuner 202 tunes to the new channel.

After the automatic tuning module 232 tunes to a specified or random channel, the event detector 302 may continue to monitor for events. If another event occurs, e.g., another commercial, the automatic tuning module 232 may cause the tuner 202 to tune to yet another specified channel from the event table 304 or a different random channel, and so on. A user may specify multiple channels for selection in order of preference. The automatic tuning module 232 may remember the original channel, so that it may return to the original broadcast after a period of time or after the commercial on the original channel is finished.

As illustrated, a secondary tuner 202 may be provided in one embodiment in order to allow the event detector 302 to monitor multiple broadcasts simultaneously. For example, after the channel is changed in response to a commercial, it may be desirable to have the secondary tuner 202 continue to tune to (but not display) the original channel, so that the event detector 302 may detect the end of the commercial. Once the commercial is over, the event detector 302 may instruct the tuner 202 to resume tuning to the original channel.

In an alternative embodiment, the event detector 302 may use the timer 308 to wait a predetermined time period, e.g., three minutes, before instructing the tuner 202 to resume tuning to the original channel. In such an embodiment, a secondary tuner 202 is not required, or the secondary tuner may be used for other purposes, such as background recording of a television broadcast using the PVR module 216.

FIG. 4 is an example of an event table 304 for associating events with one or more channels. The events may be specified using any suitable indicator or code and are not limited, therefore, to the illustrated text descriptions. Furthermore, the channels may be indicated by channel numbers, channel names, station call letters, network affiliations, or by other designations. The event table 304 may be implemented using any suitable data structure, e.g., database table, linked list, etc.

As illustrated, multiple channels may be specified for an event in order of preference. Specifying multiple channels allows the automatic tuning module 232 to cycle through the channels as events occur on subsequent channels. For example, upon a first commercial interruption, the STB 102 may automatically tune to CNBC™. When a second commercial interruption occurs, the STB 102 may automatically tune to ESPN™, and so forth. Alternatively, the automatic tuning module 232 may randomly select channels from a specified list or may select an entirely random channel.

Figure 5:
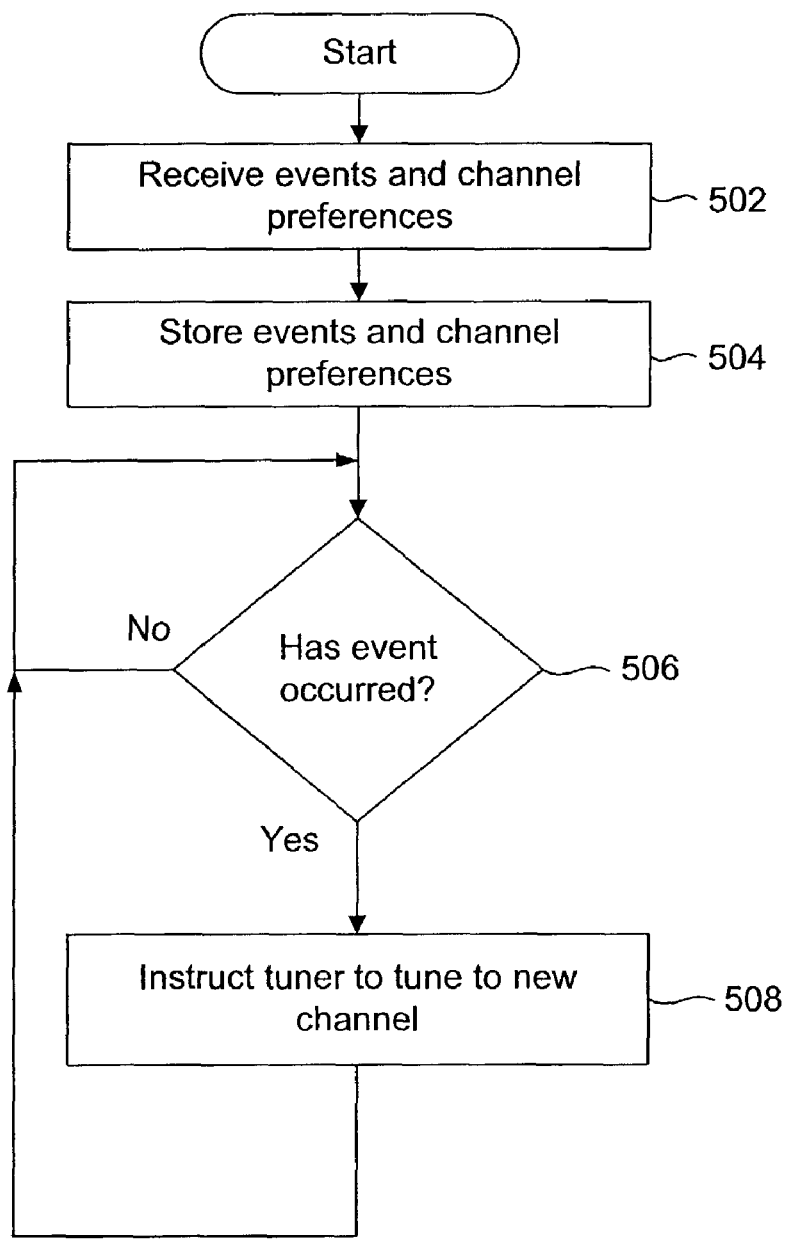
FIG. 5 is a flow diagram illustrating one method for automatic tuning.

FIG. 5 is a flow diagram of a method 500 for automatically tuning to a channel in response to an event according to an embodiment of the invention. The STB 102 receives 502 user input regarding events and channel preferences. The STB 102 stores 504 the events and channel preferences in the event table 304. As the STB 102 receives a media signal from the network 103, the event detector 302 monitors the media signal to determine 506 if an event has occurred. If so, the event detector 302 instructs 508 the tuner 202 to tune to a new channel, which may be specified or randomly chosen, as indicated in the event table 304. The event detector 302 may then return to determine 506 if another event exists.

Figure 6:
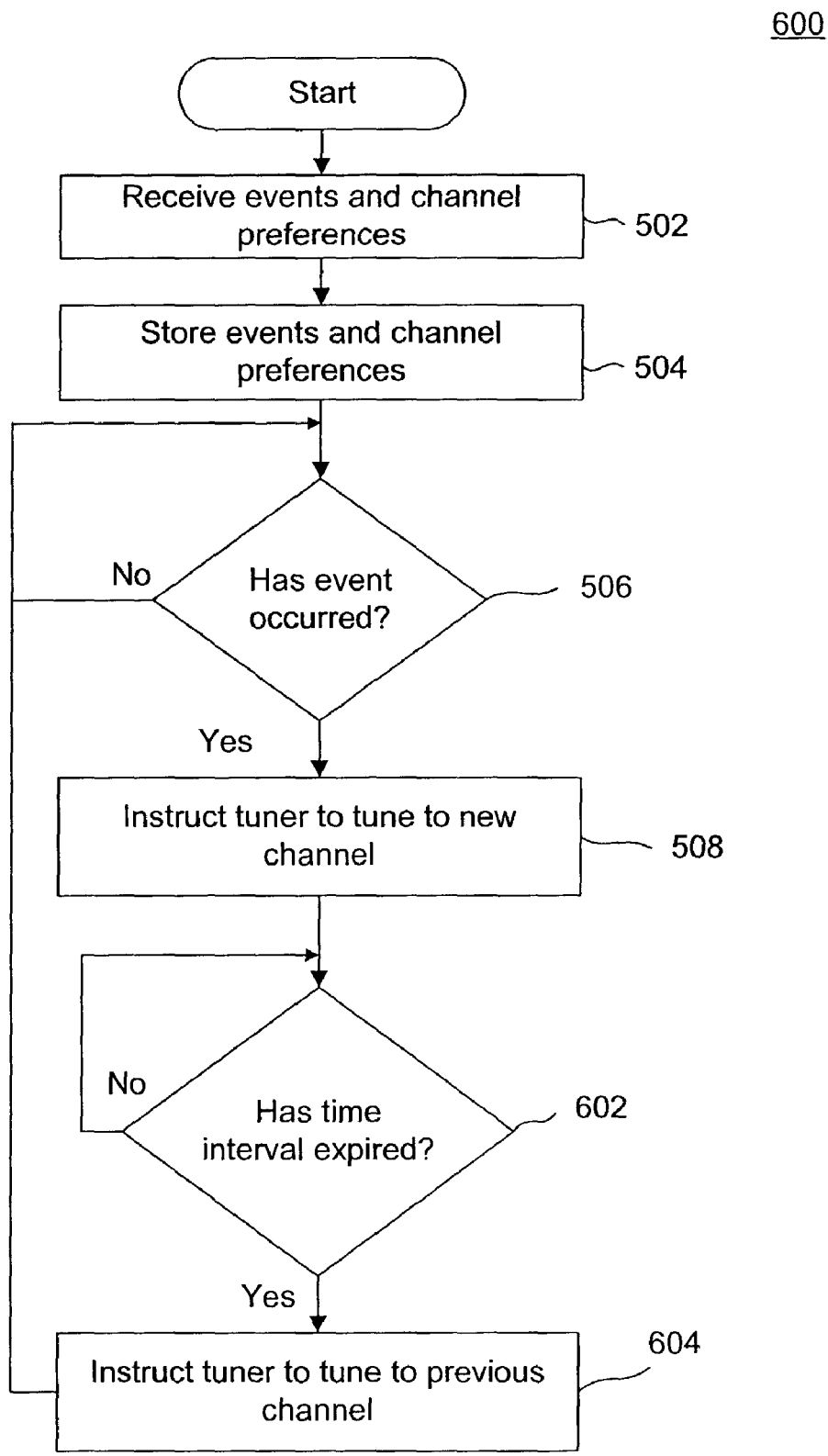
FIG. 6 is a flow diagram illustrating an alternative method for automatic tuning.

FIG. 6 is a flow diagram of an alternative method 600 according to an embodiment of the invention. Steps 502 to 508 are similar to those previously described above. Thereafter, the event detector 302 determines 602 if a predefined time interval has elapsed. For example, the time interval may approximate the typical time for a commercial interruption. If so, the event detector 302 instructs 604 the tuner 202 to return to the previous channel and the method continues once again by monitoring media signals for the occurrence of an event.

Figure 7:
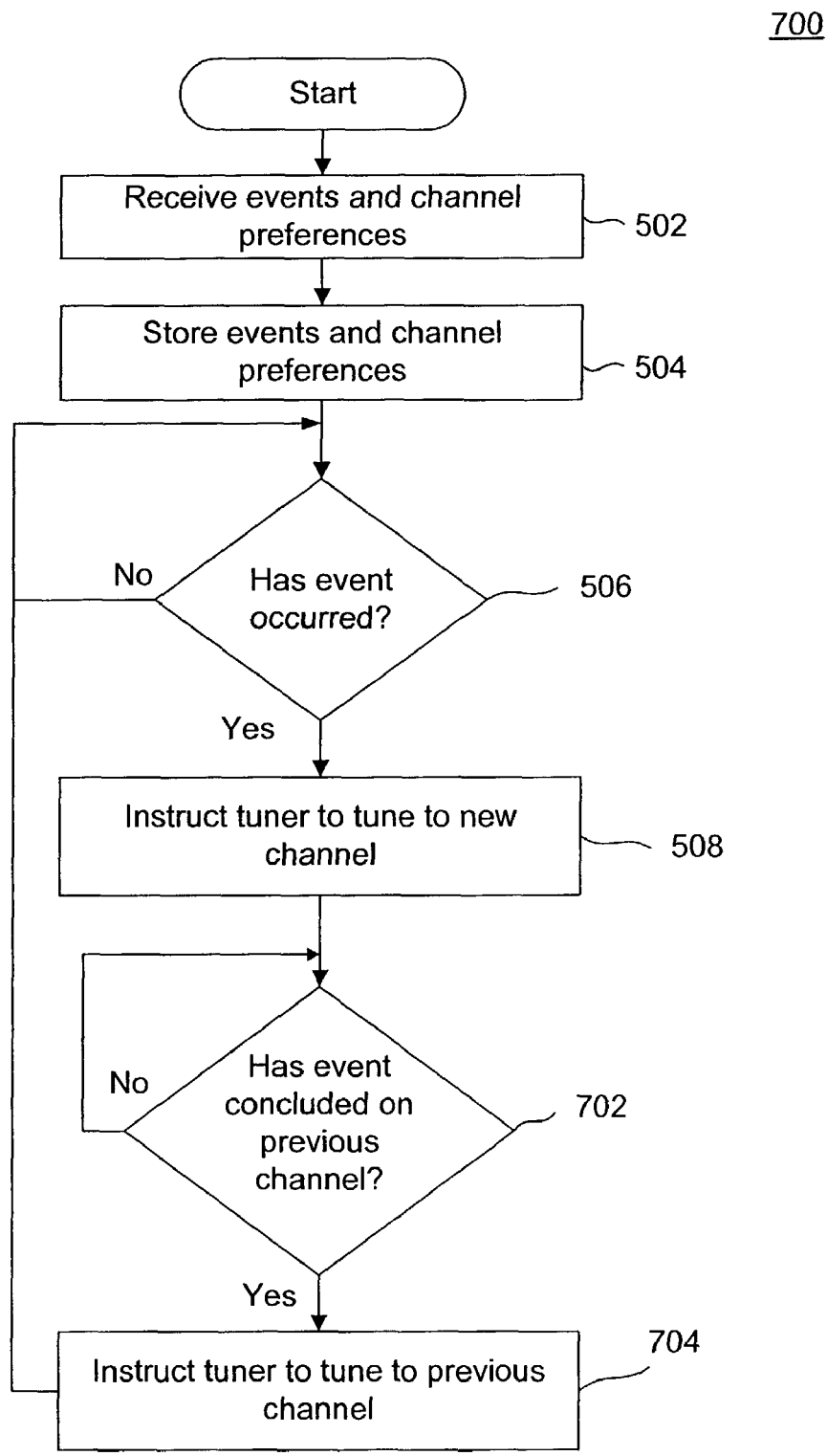
FIG. 7 is a flow diagram illustrating an alternative method for automatic tuning.

FIG. 7 is a flow diagram of an alternative method 700 according to an embodiment of the invention. Steps 502 to 508 are similar to those previously described above. Thereafter, the event detector 302 determines 702 if an event that occurred on the original channel has concluded, e.g., the commercial is over. If so, the event detector 302 instructs 704 the tuner 202 to return to the previous channel and the method continues by once again monitoring for events.

In one implementation, a desired event may take place on another channel that the tuner 202 is not currently receiving. The user may enter a preference or indicator for that event in the event table 304. The event detector 302 then locates the event based on the indicator to enable automatic tuning to the channel when the event occurs.

This feature is advantageous when a user desires to watch a certain program whenever the network 103 broadcasts the program. The event detector 302 may be in communication with the EPG module 218 to determine when the desired program is available. For instance, the event detector 302 may compare the indicator with programming data associated with the EPG module 218 to determine if a match exists. If a match does exist, the event detector 302 may obtain the start time and channel information for the program. At the start time of the program, the event detector 302 may instruct the tuner 202 to tune to the appropriate channel.

Alternatively, the event detector 302 may monitor a channel or channels for ATVEF triggers or other messages announcing an event that is occurring. The user may enter an indicator of the program and a channel or channels that will likely broadcast the program. From the indicator, the event detector 302 monitors triggers to determine when the event occurs. When the event detector 302 detects the appropriate trigger, the event detector 302 instructs the tuner 202 to tune to the appropriate channel.

In this embodiment, a sitcom, sports event, news broadcast, emergency announcement or other program may be defined as the event. A user programs the STB 102 to automatically tune to the event while the user is viewing another program. A user need not know when the program starts, as the automatic tuning module 232 conveniently provides this function. This feature of automatic tuning is helpful to users who are devoted followers of certain shows, for those who wish to be updated on certain events or programs of interest having uncertain starting times.

Thus, the automatic tuning module 232 may tune to a sitcom, such as Frasier, whenever it is broadcast on an available channel. A user, who is a devoted follower of Frasier, is presented with the show and may decide whether or not to view the show. If the user wishes to return to the previous channel, the user may simply do so by activating a suitable control.

In another example, a user may be awaiting a special news broadcast, live sporting event, overtime event, or other program. The desired program may be delayed or the start time may be unknown. The user may program the automatic tuning module 232 to tune to the desired program when it is begins.

This embodiment may also be useful in participating in an on-line auction. When the user is outbid or when the user wins, the network 103 may transmit a trigger to the tuner 202. Alternatively, the e-mail client 222 or web browser 220 may receive a trigger, a link, or other notification that a competitor has outbid the user. If the auction is progressing through a televised broadcast, the automatic tuning module 232 tunes to the auction program when the event occurs. The user may then view the status of the auction.

Figure 8:
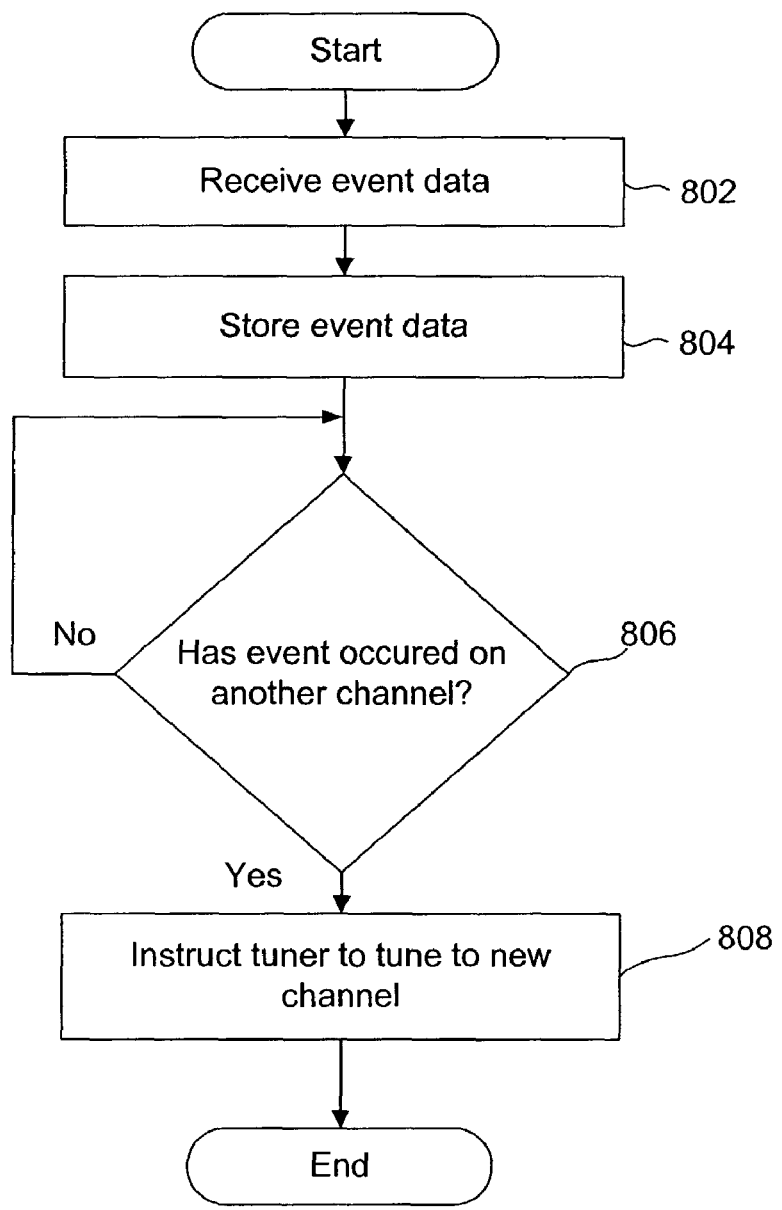
FIG. 8 is a flow diagram illustrating an alternative method for automatic tuning.

FIG. 8 is a flow diagram of a method 800 for automatic tuning to a desired event. The user enters 802 event data relating to the desired event into the automatic tuning module 232. Event data may include an indicator of a program, such as a program title or identification number. The event data may include a subject matter indicator such as "special news bulletin" or "L.A. Lakers overtime." The event data may include a channel or channels which will broadcast the desired programming.

The automatic tuning module 232 stores 804 the event data in the event table 304. The event detector 302 then monitors one or more channels to determine 806 if the event occurs on another channel. The event detector 302 may review program listings in the EPG module 218 to identify an event or perform other functions known in the art for identifying a program start time. When the start time arrives, the event detector 302 instructs 808 the tuner 202 to change to the new channel.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A system for automatically surfing television program sources in response to an event, the system comprising:
 a television tuner to tune to a first television program source;
 an event table comprising a plurality of entries for a plurality of different unscheduled event types, wherein each entry associates a different unscheduled event type with a respective television program source; and
 an event detector to detect an unscheduled event that occurs during a television program and to determine an unscheduled event type associated with the detected event from the plurality of unscheduled event types, the determined event type being based upon a program source associated with the unscheduled event type,
 wherein, upon detecting the unscheduled event and determining the unscheduled event type, the event detector instructs the television tuner to automatically tune to a second television program source wherein the second television program source is different from the first television program source and is associated with the detected unscheduled event type in the event table.

2. The system of claim 1, wherein an unscheduled event type comprises a commercial on the first television program source.

3. The system of claim 1, wherein an unscheduled event type comprises an emergency alert system (EAS) broadcast on the first television program source.

4. The system of claim 1, wherein an unscheduled event type comprises detection of objectionable language within closed captioning data on the first television program source.

5. The system of claim 1, wherein an unscheduled event type comprises determination of an age-based rating for a broadcast on the first television program source that is beyond a specified threshold.

6. The system of claim 1, wherein an unscheduled event type comprises a specified program commencing on the second television program source.

7. The system of claim 1, wherein an unscheduled event type comprises an arrival of a trigger.

8. The system of claim 1, wherein an unscheduled event type comprises a user being outbid at an online auction.

9. The system of claim 1, wherein an action taken in response to detecting the detected unscheduled event type is to select a randomly selected television program source as the second television program source.

10. The system of claim 1, wherein an entry in the event table comprises a plurality of television program sources specified by a user in order of preference associated with an unscheduled event type.

11. The system of claim 1, wherein the event detector is operable to instruct the television tuner to tune back to the first television program source after a predetermined time interval.

12. The system of claim 1, wherein the event detector is operable to instruct the television tuner to tune back to the first television program source after completion of the detected unscheduled event.

13. The system of claim 12, further comprising:
 a second television tuner to monitor a broadcast on the first television program source to detect the completion of the detected unscheduled event.

14. The system of claim 1, wherein the event detector is operable to notify a user before tuning to the second television program source.

15. The system of claim 1, wherein the event detector is to notify a user of the detected unscheduled event after the television tuner tunes to the second television program source.

16. A method for automatically surfing television program sources, the method comprising:
 displaying a first television program source;
 detecting an unscheduled event that occurs during a television program on the first television program source, wherein the detected unscheduled event is determination of an age-based rating of a broadcast on the first television program source;
 accessing an entry associated with an age-based rating event type in an event table comprising a plurality of entries, wherein each entry in the unscheduled event table associates a different unscheduled event type with a respective television program source;
 automatically tuning to a second television program source associated with the age-based rating event table entry in response to detecting the age-based rating; and preventing subsequent tuning to the first television program source until one of a predetermined period of time has elapsed or an authorized person enters a password.

17. A method for automatically surfing television program sources in response to an unscheduled event, the method comprising:
   tuning to a first television program source;
   detecting an unscheduled event that occurs during a television program;
   determining an unscheduled event type of the detected event from a plurality of unscheduled event types;
   accessing an entry in an unscheduled event table associated with the detected unscheduled event type, wherein the unscheduled event table comprises a plurality of entries, and wherein each entry in the unscheduled event table associates a different unscheduled event type with a respective television program source; and
   tuning a television tuner to a second television program source that is different from the first television program source and is associated with the unscheduled event type of the detected unscheduled event in the unscheduled event table.

18. The method of claim 17, wherein detecting an unscheduled event comprises detecting a commercial on the first television program source.

19. The method of claim 17, wherein detecting an unscheduled event comprises detecting an emergency alert system (EAS) broadcast on the first television program source.

20. The method of claim 17, wherein detecting an unscheduled event comprises detecting objectionable language within closed captioning data on the first television program source.

21. The method of claim 17, wherein detecting an unscheduled event comprises detecting an age-based rating for a broadcast on the first television program source that is beyond a specified threshold.

22. The method of claim 17, wherein detecting an unscheduled event comprises detecting that a specified program is commencing on another television program source.

23. The method of claim 17, wherein detecting an unscheduled event comprises detecting a trigger.

24. The method of claim 17, wherein detecting an unscheduled event comprises detecting that a user has been outbid at an online auction.

25. The method of claim 17, wherein tuning to the second television program source associated with the unscheduled event type of the detected unscheduled event in the event table comprises tuning to a random television program source.

26. The method of claim 17, wherein tuning to the television program source associated with the unscheduled event type of the detected unscheduled event in the unscheduled event table comprises tuning to one of multiple television program sources specified by a user in order of preference.

27. The method of claim 17, further comprising:
   tuning back to the first television program source after a predetermined time interval.

28. The method of claim 17, further comprising:
   tuning back to the first television program source after completion of the detected unscheduled event.

29. The method of claim 17, further comprising:
   prompting a user for approval before tuning to the television program source associated with the unscheduled event type of the detected unscheduled event in the unscheduled event table.

30. The method of claim 17, further comprising:
   notifying a user of the detected unscheduled event after tuning to the television program source associated with the unscheduled event type of the detected unscheduled event in the unscheduled event table.

31. One or more non-transitory computer readable media comprising program code for causing a computer to perform a method for automatically surfing television program sources in response to an event, the method comprising:
   tuning to a first television program source;
   associating a plurality of different unscheduled event types with respective television program sources in an event table;
   detecting an unscheduled event that occurs during a television program;
   determining an unscheduled event type of the detected event from a plurality of unscheduled event types; and
   tuning a television tuner to a second television program source that is different from the first television program source and is associated with the detected unscheduled event type in the event table.

* * * * *